United States Patent [19]

Lipeles et al.

[11] Patent Number: 4,963,390

[45] Date of Patent: Oct. 16, 1990

[54] METALLO-ORGANIC SOLUTION DEPOSITION (MOSD) OF TRANSPARENT, CRYSTALLINE FERROELECTRIC FILMS

[75] Inventors: Russell A. Lipeles, Los Angeles; Dianne J. Coleman, Long Beach, both of Calif.

[73] Assignee: The Aerospace Corporation, El Segundo, Calif.

[21] Appl. No.: 253,538

[22] Filed: Oct. 5, 1988

[51] Int. Cl.$^5$ .............................................. B05D 5/12
[52] U.S. Cl. .................................. 427/110; 427/100; 427/108; 427/126.2; 427/126.3; 427/162; 427/240; 427/226; 427/421; 427/420.1; 427/443.2
[58] Field of Search ............... 427/162, 100, 108, 110, 427/126.2, 126.3, 240, 421, 430.1, 443.2, 226

[56] References Cited

U.S. PATENT DOCUMENTS

| | | | |
|---|---|---|---|
| 3,081,200 | 3/1963 | Tompkins | 427/126.3 |
| 4,485,094 | 11/1984 | Pebler et al. | 427/226 |
| 4,510,182 | 4/1985 | Cornils et al. | 427/226 |
| 4,792,463 | 12/1988 | Okada et al. | 427/126.3 |

*Primary Examiner*—Janyce Bell
*Attorney, Agent, or Firm*—William J. Burke

[57] ABSTRACT

An improved process to deposit transparent, crystalline, ferroelectric films from metallo-organic solutions on platinum, glass, quartz, and sapphire substrates is disclosed. The use of this process results in a significant improvement in the transparency of perovskite, ferroelectric lead titanate (PT), lead zirconate titanate (PZT) and doped-PZT films (e.g. films doped with lanthanum, PLZT).

7 Claims, 20 Drawing Sheets

METALLO-ORGANIC SOLUTION DEPOSITION (MOSD) OF TRANSPARENT, CRYSTALLINE FERROELECTRIC FILMS

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The present invention relates in general to an improved process for making thick, transparent, crystalline oxide films and in particular to ferroelectric oxides such as lead titanate (PT:$PbTiO_3$), lead zirconate (PZ:$PbZrO_3$), lead zirconate titanate (PZT:$PbZr_xTi_{1-x}O_3$, $0<x<1$), PZTs doped with one or two metals such as lanthanum (PLZT:$Pb_{1-x}La_x(Zr_yTi_{(1-y)})_{(1-x/4)}O_3$, barium titanate (BT:$BaTiO_3$), strontium barium niobate (SBN:$Sr_xBa_{1-x}Nb_1O_3$), and lithium niobate (LB: $LiNb_1O_3$).

2. Description of the Prior Art

The challenge in making films specifically for optical devices lies in obtaining transparent, crystalline films with the rhombohedral or tetragonal perovskite crystal structure required to support ferroelectric domain formation. In the past, well-formed 0.5 to 5 $\mu m$ thick transparent crystalline films were difficult to obtain due to uncontrolled growth of crystal grains and film cracking during annealing. Cracking occurs when the polymer network becomes very rigid from crystallization while simultaneously undergoing shrinkage due to loss of organic by-products.

Oxide films have been deposited previously from alcoholic solutions of metallo-organic (alkoxide and carboxylic acid salt) precursors using a sol-gel process. Those films were primarily thin conductive coatings for window glass. That Process calls specifically for gradually heating the coated substrate to 650° C. which teaches contrary to the present Process. While uncontrolled grain growth is expected to occur in that sol-gel process, control of the crystallinity is not important when the object of the process is to produce thin conductive crystalline films.

Sol-gel deposition of PT, PZT and PLZT films has been previously reported by several sources In those techniques, metallo-organic starting materials are mixed in an organic solution. Water can be added to hydrolyze the solution to form inorganic polymers consisting of metal-oxygen-metal linkages. Hydrolysis can be catalyzed by either acid or base. In analogy with sol-gel production of silica-glasses, other additives can be used to affect the structure of the Polymer (or gel) in order to control the drying and consolidation of the gel to form the oxide.

The transparency of ferroelectric films deposited by the sol-gel process also depends on the chemical composition of the film. When PLZT films are made, uncontrolled grain growth results in lower transparency in zirconia-rich compositions. The MOSD process controls the grain growth resulting in more transparent zirconia-rich PLZT films.

These descriptions of sol-gel deposition of ferroelectrics in the literature do not address control of the grain structure of the film that is essential for making transparent ceramic films. In the present process, we rapidly consolidate or densify the film at moderate temperatures in an amorphous state. In this state the inorganic polymer is flexible enough to release stress and avoid cracking. A separate annealing step is used to crystallize the film. Our densification and annealing process is an advance of the state-of-the-art in making thick transparent, crystalline, ferroelectric PZT and PLZT.

It is the object of this invention to provide a process that controls grain growth in ferroelectric oxide films resulting in thick (0.5 $\mu m$ to 5 $\mu m$), transparent, ferroelectric oxide films.

SUMMARY OF THE INVENTION:

In order to distinguish this process from prior, sol-gel processes used for amorphous glasses and thin crystalline films, the improved process is termed metallo-organic solution deposition (MOSD). In both processes, metallo-organic starting materials such as alkoxides are mixed and reacted in an organic solvent to form a viscous solution containing an inorganic polymer with a metal-oxygen-metal backbone. In the MOSD process, lateral stress and cracking are reduced in the film specifically through a three step heating process.

DETAILED DESCRIPTION OF THE INVENTION:

The MOSD process overcomes the prior art problems mainly through improvements in thermal processing. In the first step, amorphous layers are deposited from a viscous solution by multiple coating with drying at low temperature to remove the volatile solvents. Next, the layer is densified by heating at high rates (greater than 5° C./sec) and held at a moderate temperature (about 400° C. to 650° C. for PZT) after applying each layer. Because the polymer network is still flexible, the loss of organics from the film does not result in stress and cracking. After several layers have been deposited, dried, and densified, the film is annealed at a higher temperature (about 525° C. to 800° C.) to crystallize the film.

The critical steps in the MOSD process that advance the state-of-the-art are the rapid high temperature densification and annealing procedures. The MOSD process consists of the following steps:

1. The alkoxide and carboxylic acid salt starting materials are mixed and processed in the liquid state to form a coating solution.

2. The coating solution is spin-cast or dip-coated or sprayed on the substrate.

3. The solvent is removed by low temperature drying in air or a vacuum to avoid pyrolysis of the organic solvent.

4. Rapid heating (greater than 5° C./sec) and short duration drying/densification is used at temperatures high enough (about 400° C.) to remove most of the organic by-products but maintain a stress-free amorphous film.

5. After repeated coating, drying, and densifying to build up the desired film thickness, a final annealing cycle at higher temperature is used to remove the remaining organics and crystallize the oxide film.

A significant improvement in film morphology is obtained by using the two step drying/annealing process. This results in improved ferroelectric film transparency compared to that obtained from the prior art.

A wide choice of annealing temperatures and times are Possible in MOSD allowing the grain size to be optimized for transparency, dielectric constant, and electrooptical coefficient as described in the examples. Steps (4) and (5) are the essence of the MOSD process. In the MOSD process, shrinkage occurs at moderate temperatures and short times before the polymer matrix becomes crystalline, rigid, and subject to cracking. Fine-grained, crack-free, transparent films are obtained from the dense, amorphous gel by annealing.

These examples are described to illustrate the advantages of the invention.

EXAMPLE 1

A specific MOSD procedure to produce $PbZr_{0.5}Ti_{0.5}O_3$ is described below.

1. For 0.1 mole of PZT using liquid starting materials, 93.8g of lead 2-ethylhexanoate, $Pb(O_2C_8H_{15})_2$, (22.1 weight percent Pb), 18.6g of zirconium n-propoxide, $Zr(OC_3H_7)_4$, (24.5% Zr) and 17.1g of titanium n-butoxide, $Ti(OC_4H_9)_4$, (14.% Ti) were mixed. A coating solution was prepared by adding 5g of the starting material mixture to 5g of isopropanol.

This solution was filtered and immediately used to coat 1 in$^2$ fused silica, platinum, or sapphire substrates that were previously degreased with detergent and water, trichloroethylene, methanol, acetone, methanol, and isopropanol rinses. The substrates were flooded with about 0.5-1.0 ml of the filtered coating solution while being spun at 2000-4000 rpm on a photo-resist spinner.

3. After spinning for about 1 minute, the sample was placed on a 100-110° C. hot plate for 10 minutes to drive off the isopropanol solvent.

4. The film was heated at a rate of 6.7° C./sec and held at 400° C. for 10 minutes. Rapid heating drives off most of the organics from the film. The organics remaining in the film suppressed crystallization and resulted in the amorphous structure.

After cooling to room temperature, the substrate was recoated and dried by repeating steps (2) and (3) about 8 to 14 times until the desired coating thickness was obtained (1-2 μm). At this point, the coating structure remained amorphous.

5. This amorphous film was converted to a transparent, perovskite film by annealing at 525° C. Annealing was performed by ramping the temperature to 525° C. at a rate of 0.5 to 0 C./min and holding at 525° C. for 2.5 hours. Almost all of the organics were removed by this treatment as observed using Fourier Transform Infrared Spectroscopy (FTIR). X-ray diffraction spectra confirmed the formation of randomly oriented perovskite PZT.

EXAMPLE 2

A small amount of water can be added to the coating solution and the mixture refluxed if hydrolysis of the starting materials is desired. The substrates were coated using the procedure in Example 1. Dense films were obtained where the mole ratios of water to metals varied from 0 to 0.5. Higher ratios of water resulted in very porous films.

EXAMPLE 3

High quality films were obtained using the procedure in Example 1 except that more frequent annealing was used. The film was annealed after half of the layers were deposited and annealed again after the depositions were completed.

EXAMPLE 4

A similar procedure as in Example 1 was used except that faster temperature ramps and shorter holds at 525° C. to 600° C. were used to obtain good quality PZT films.

EXAMPLE 5

A similar process as in Example 1 was used except that doped PZT was deposited. PLZT with the composition $(Pb_{0.82}La_{0.08})(Zr_{0.65}Ti_{0.35})_{1-3 1 0.08/4}O_3$ was prepared by dissolving lanthanum 2,4 pentanedionate or lanthanum acetate into the PZT coating solution in step 1. Transparent, Perovskite films were obtained with a dielectric constant of at least 900 and a loss tangent of 2%.

Application of an electric field to these materials changes their birefringence. This electrooptical change can be used to make spatial light modulators, color filters, total internal reflection modulators, and other devices that depend on high transparency and a large electrooptical coefficient. These high quality films can also be used in pyroelectric devices, acoustooptic modulators, piezoelectric transducers, and as a dielectric layer and electronic packaging material.

We claim:

1. An improved coating deposition process for transparent, ferroelectric films up to 5mm thick consisting of the following steps:
   a. mixing liquid state metallo-organic starting materials consisting of at least one alkoxide or carboxylic acid salt of the metals selected from a group consisting of barium, strontium, lead, lanthanum or lithium or a from a group consisting of zirconium, titanium or niobium to form a coating solution;
   b. spinning, dipping, or spraying the coating solution on the substrate to be coated;
   c. drying the coated substance at low temperature in the range of 100-200° C. in air or a vacuum, thereby removing low boiling solvent molecules;
   d. rapidly densifying the coated substrate at moderate temperature (400-600° C, thereby forming an amorphous film;
   e. repeatingthe above steps until a desired coating thickness is obtained; and
   f. annealing the thus formed film at a temperature in the range 525-800° C. to obtain a transparent ferroelectric oxide film with a controlled grain size.

2. The process in claim 1 where the metallo-organic starting materials are one to six carbon containing alkoxides or one to eight carbon carboxylic acids.

3. The process in claim 1 where the metals in the metallo-organic starting materials are selected from the group of metals consisting of lead, lanthanum, zirconium, titanium, barium, and lithium.

4. The process in claim 1 where the stoichiometry of the compound is $Pb_{1-x}La_x(Zr_yTi_{(1-y)})(1-x/4)O_3$ and x varies from 0.0 up to 0.20 and y varies from 0.0 up to 1.0.

5. The process in claim 1 where the coating solution produces the oxide $BaTiO_3$.

6. The process in claim 1 where the coating solution produces the oxide lithium niobate, $LiNb_1O_3$.

7. The process in claim 1 where the coating solution produces the oxide strontium barium niobate, $Sr_xBa_{1-x}N[b_2O_6]$ where x varies from 0.25 to 1.00.

* * * * *